Patented Oct. 21, 1952

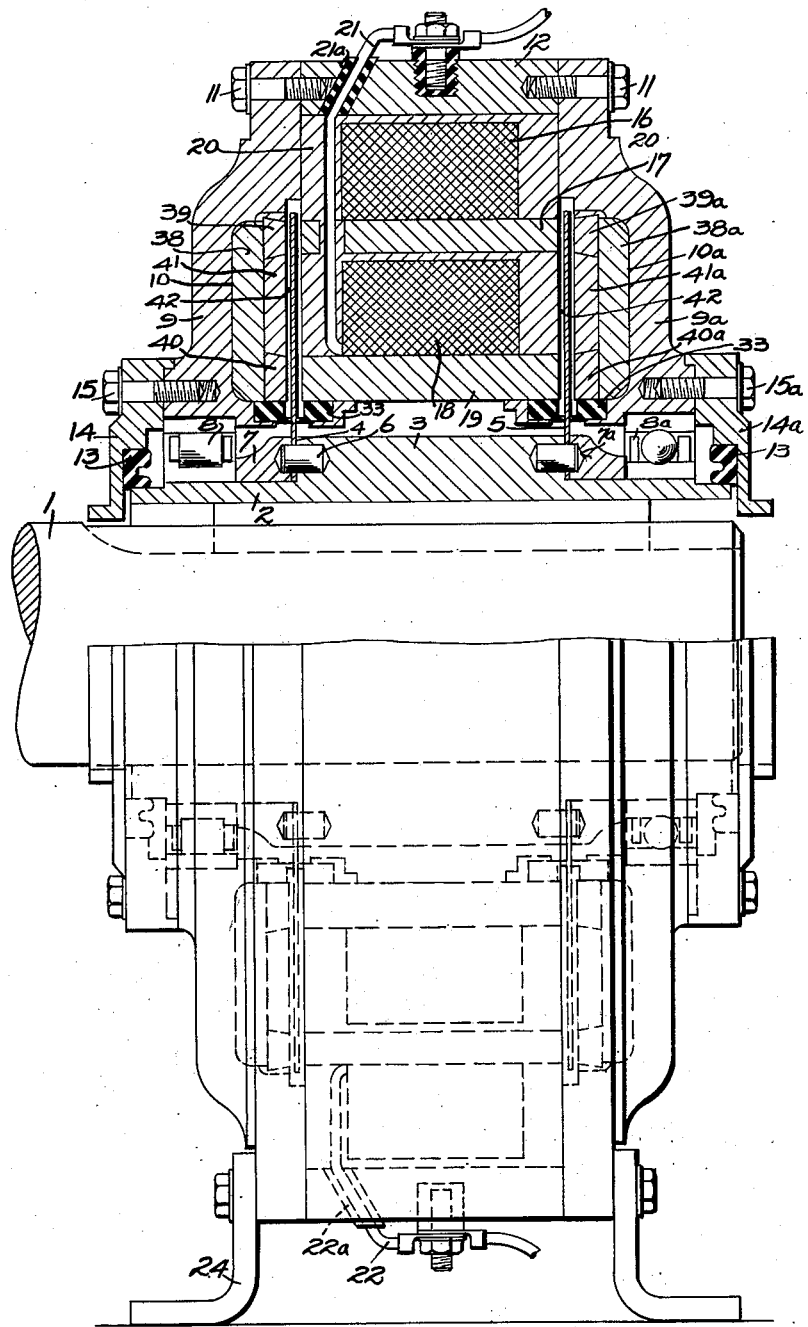

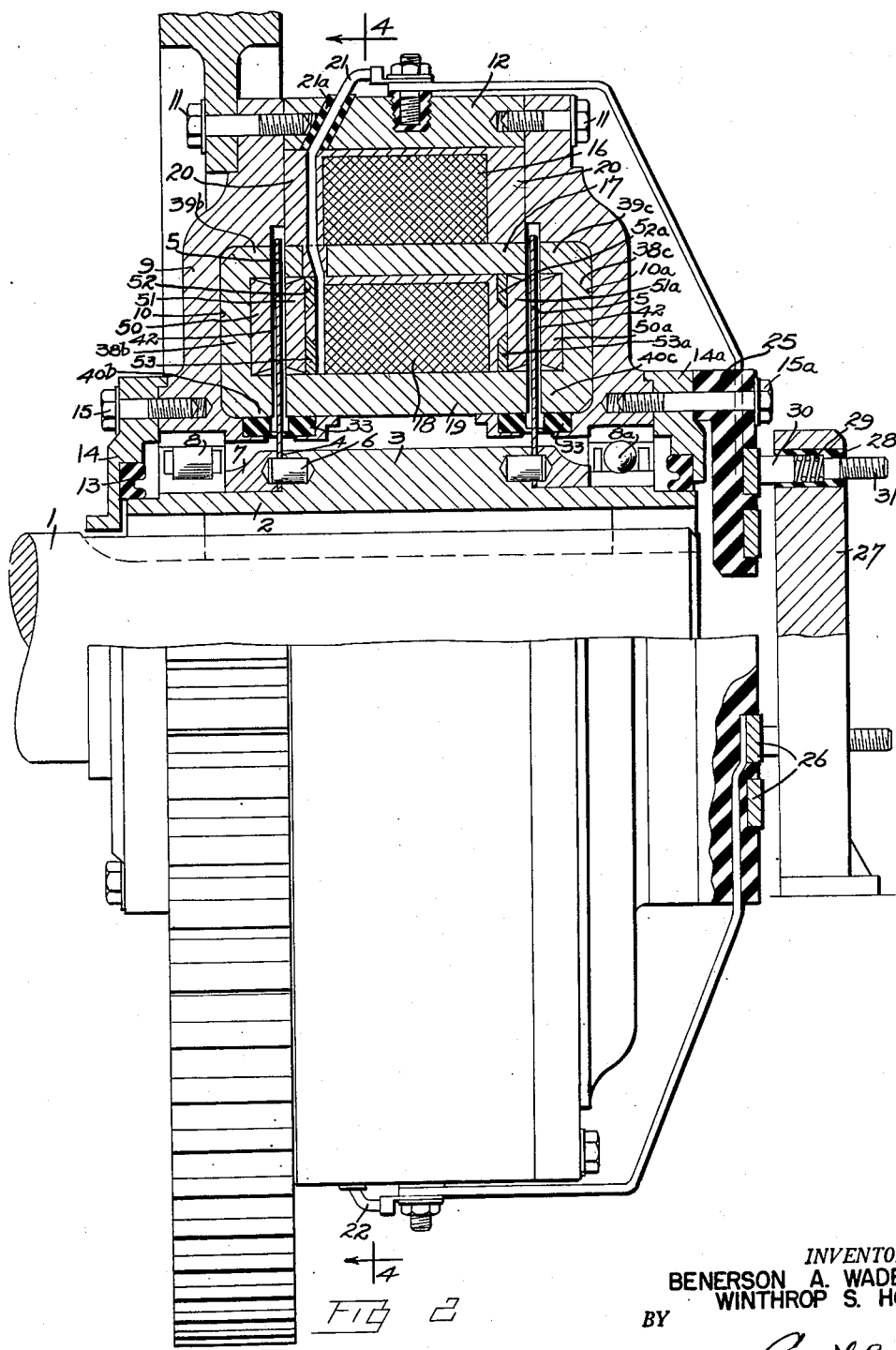

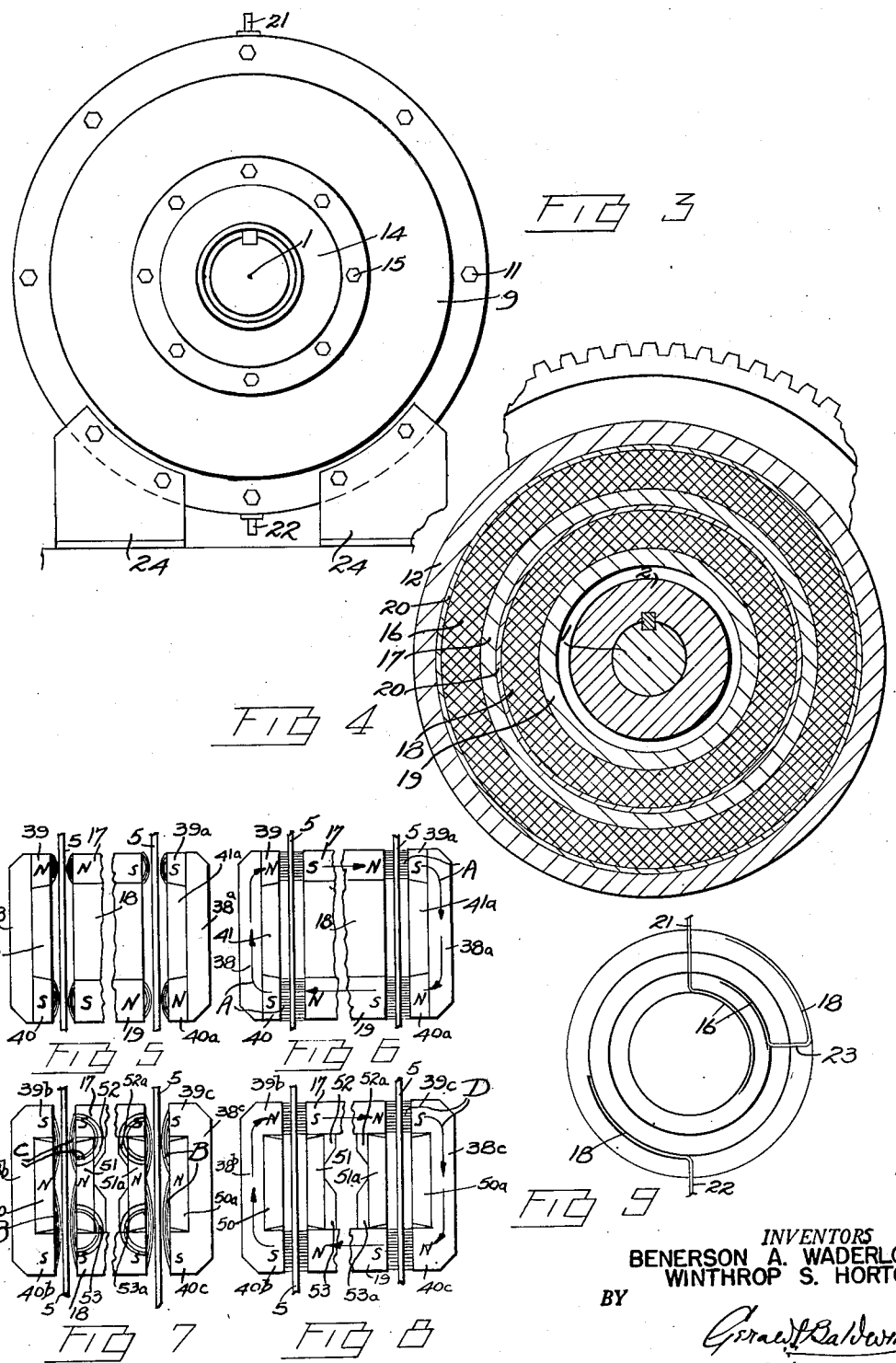

2,614,668

UNITED STATES PATENT OFFICE 2,614,668

FLUID MAGNETIC CLUTCH

Benerson A. Waderlow, Lathrup Township, Oakland County, and Winthrop S. Horton, Farmington Township, Oakland County, Mich., assignors to B. A. Waderlow and Co., Detroit, Mich., a corporation of Michigan Application July 7, 1949, Serial No. 103,426

7 Claims. (Cl. 192—21.5)

This invention relates to improvements in fluid magnetic clutches. Up to now the use of clutches of this type has been relatively restricted due to the high frictional drag produced between the input and output members when the clutch is running free, and also because gravitational, or centrifugal forces cause such distribution of the iron powder or other magnetic particles when the clutch is not in operation, or in free running position, that the particles move away to a large extent from the magnetic faces between which they are intended to function.

This invention aims, among other things, to provide a fluid magnetic clutch wherein frictional drag between the input and output members is substantially eliminated when the clutch is in free running position.

Another object of the invention is to provide a fluid magnetic clutch wherein means are provided for preventing material movement of the magnetic particles relative to the magnetic faces when the clutch is either inoperative or free running.

In clutches of this general nature one of the troubles has been that, although it is quite simple magnetically to hold an input member in power transmitting relation to an output member, when the current ceases to flow the flux in the circuit falls to small intensity, and, owing to the moderately high permeance of the gap when filled with iron powder, the circuit does not become completely demagnetized, and in consequence the residual flux causes a continuing drag which results in loss of power and heating.

It is an object of this invention to provide a fluid magnetic clutch including an arrangement of high energy permanent magnets for maintaining the input and output members either free running, or in power transmitting relation to one another, whichever may be the normal condition, and electromagnets by which the power of the permanent magnets is overcome to provide the reverse condition, that is to retain the two members in either power transmitting relation and free to move relative to one another.

Moreover by the use of opposed magnets, and means for reversing the polarity of some of them, each opposing pair of magnets may be either of the same or opposed polarity, that is each opposing pair may be north and south, both south or both north. When the polarity of each opposing pair of magnets is the same repulsion results, and the powdered iron or other magnetic particles between the magnets are built up around and immediately adjacent each magnet face, thereby leaving a gap free of iron powder centrally between the magnets so that one member is freely movable relative to the other. However as soon as the polarity of one of each opposing pair of magnets is reversed attraction results, so that a magnetic flux passes through them, through the iron powder and through the member between the magnets, consequently torque force is exerted upon the said member and independent or free movement of the latter is impossible. This latter statement, however should be qualified to the extent that if the magnetic force flowing between the opposed magnet faces is weak only a drag, rather than a locking action is exerted upon the member positioned between and spaced from the opposed magnetic faces.

Having thus briefly and broadly stated some of the objects and advantages of the invention, I will now describe two preferred embodiments thereof, with the aid of the accompanying drawings, in which:

Figure 1 is a side view partly in section showing one arrangement of the magnets and the discs between them, the magnets in this instance being mounted on a housing which is shown stationary.

Figure 2 shows a side view, partly in section, of a modified arrangement of the magnets which in this case are supported in a housing which is shown rotatable.

Figure 3 is an end view of Figure 2 on a reduced scale.

Figure 4 is a section on the line 4—4 of Figure 1 on a reduced scale.

Figures 5 and 6 are diagrams showing the upper half only of the annular magnetic arrangement and the discs shown in Figure 1; the discs being freely rotatable in Figure 5, and in power transmitting relation, in Figure 6, relative to the housing.

Figures 7 and 8 are diagrams showing the upper half only of the annular magnetic arrangement and the discs shown in Figure 2, wherein the discs are freely rotatable and in power transmitting relation to the housing respectively.

Figure 9 is a diagram showing the clockwise winding of one of the magnetic coils and the anti-clockwise winding of the other.

Referring to the drawings, 1 designates a shaft having a sleeve 2 keyed or otherwise secured around it intermediately of its length. The central portion 3 of the sleeve 2 is of increased diameter, and bearing against the annular shoulders 4 thus formed at opposite ends of the said central portion are annular rotors or discs or elements 5 which are secured to the sleeve 2 for rotation therewith by pins 6 projecting from the said shoulders. Each pin also engages a spacer ring 7 or 7a the outer face of which rests against the inner face of a roller bearing 8 or a ball bearing 8a respectively, so that the discs 5 are held against axial movement. Mounted around the bearings 8 and 8a is a housing including annular housing members 9 and 9a, preferably made of non-magnetic material, having annular recesses 10 and 10a respectively formed in their opposed inner faces, and a circular casing 12 extending between the outer peripheries of the said members 9 and 9a and secured to the latter as by bolts 11. Outwardly spaced from the bearings 8 and 8a are oil retaining rings 13 which bear against inturned annular flanges 14 and 14a secured to the members 9 and 9a as by bolts 15 and 15a respectively.

Mounted within the circular casing 12 is an outer magnetizing coil 16 which is wound around an outer ring 17 made of magnetic material, and within the ring 17 is an inner magnetizing coil 18 which is, in turn, wound around an inner ring 19 also made of magnetic material. The coils 16 and 18 each have a similar number of coils of wire, and the rings 17 and 19 are of the same axial area. The coils 16 and 18 and the rings 17 and 19 may be secured to the casing 12 and held coaxial with the shaft 1 within the said casing in any preferred manner, in the present instance a soft metal filler 20 is employed which covers the lateral extremities of the coils 16 and 18 and has its opposite sides flush with the lateral faces of the rings 17 and 19 so that a radial gap 42 of substantially uniform width is formed between the ends of the rings and filler and the annular housing members 9 and 9a and parts hereinafter described and carried by the said members. The discs 5 lie in the gaps 42 substantially centrally of the width of the latter. The outer radial extremities of the gaps 42 are defined by inwardly stepped portions of the housing members 9 and 9a which are secured to the opposed outer faces of the filler 20. The gaps are filled with finely powdered iron or other magnetic particles in a suitable vehicle such as oil. In order to prevent passage of this powdered iron inwardly to the sleeve 2 and into the bearings 8 and 8a suitable packing pieces, as shown at 33, are mounted to wipe opposite sides of the discs 5 adjacent their inner extremities.

A lead 21, which extends through an insulator 21a provided in the annular casing 12, is connected to one extremity of the coil 18, and a second lead 22 passing through another insulator 22a in the said casing is connected to one extremity of the coil 16. In Figure 9 a short connection 23 is shown which extends between adjacent ends of the two coils which, as well as being connected in series, are so wound that the current flows in one rotary direction through one coil and in the opposite rotary direction through the other.

Figure 1 shows the housing, including its members 9 and 9a and the circular casing 12, stationary, and in Figure 2 the housing is shown mounted for rotation; it is however understood that in either case the housing may be either stationary or rotatable to suit the equipment in conjunction with which the clutch is to be employed. When the housing is stationary it is suitably mounted, as upon supports 24 secured to the members 9 and 9a; in that case wires—not shown—extending from a source of power are connected to the leads 21 and 22. When the housing is to be rotated a conventional slip ring arrangement is employed. In Figure 2 this consists of an insulating disc 25, having concentric contact rings 26 embedded therein and projecting from its outer face, attached to the flange 14a by the bolts 15a. Mounted on the shaft 1 outwardly of the disc 25 is a circular plate 27 having insulating bushings 28 extending therethrough. The bore of the inner portions of the bushings 28 is larger than the bore of the outer portions. Mounted in the inner portions are brushes 30 urged against the rings 26 by springs 29 against the outer extremities of which terminal screws 31 bear.

Referring now to the arrangement shown in Figure 1, mounted on the bases of the annular recesses 10 and 10a are magnetic annular pole pieces 38 and 38a having high energy permanent magnets (preferably made of "Alnico" or other similar alloy) 39 and 40, and 39a and 40a extending from their outer and inner peripheries respectively toward the adjacent discs 5. The magnets 39 and 40, and 39a and 40a, all of which are annular, are spaced by suitable non-magnetic filler pieces 41 and 41a respectively, the outer faces of which are flush with the outer faces of the fixed magnets between which they are arranged to maintain uniform spacing between them and the outer faces of the adjacent discs 5.

As may be seen in the diagrams in Figures 5 and 6, the two permanent magnets 39 and 40, or 39a and 40a, connected to the pole piece 38, or 38a, respectively, are of opposed polarity and when the coils 16 and 18 are not energized the flux path is as indicated by the flow lines A in Figure 6, namely, from the magnet 39, across the left hand gap 42 and disc 5, the outer ring 17, the ring hand gap 42 and disc 5, through the magnet 39a, radially inwardly across the pole pieces 38a, through the magnet 40a, across the right hand gap 42 and the disc 5, across the inner ring 19, the left hand gap 42 and disc 5, the magnet 40, and radially outward through the pole piece 38 to the magnet 39. The expressions "left hand" and "right hand" in connection with the gaps 42 refer of course to Figure 6. Due to the fact that the opposite adjacent faces of the rings 17 and 19, and the magnets 39 and 39a and 40 and 40a are all of opposed polarity the iron particles form chains drawn into close physical contact across the gaps along the lines of the flux path on both sides of the discs 5. The particles thus produce a force equal to the attractive effort exerted between all the opposed pairs of poles multiplied by the coefficient of friction in the slip planes of movement of the discs.

However when the coils 16 and 18 are energized the polarity at both ends of the rings 17 and 19 is reversed, so that instead of having both north and south poles opposite one another which resulted in the flux path just described, and attractive forces established between each opposed pair of pole faces, now all like poles are opposite one another, either north opposite north or south opposite south, as indicated in Figure 5. Consequently flux repulsion is exerted which causes the iron particles to accumulate upon and immediately adjacent the pole faces, thereby leaving clear spaces midway between the said faces in which the discs are free to rotate out of frictional contact with the iron particles. Thus, it will be seen that a sufficient quantity of iron particles is retained immediately adjacent the pole faces at all times, and there is no fear of their all collecting adjacent the outer or inner extremities of the gaps 42 when the clutch is either free running or not in operation. Consequently the iron particles remain so positioned in the gaps 42 that the clutch is immediately fully operative when the supply of current to the coils 16 and 18 is cut off.

In the arrangement shown in Figure 2, and in the diagrams shown in Figures 7 and 8, the annular pole pieces 38b and 38c are of substantially channel section, and have their outer and inner annular poles 39b and 39c and 40b and 40c opposite the adjacent ends of the rings 17 and 19 respectively. Mounted in each pole piece 38b and 38c is an annular high energy permanent magnet 50 and 50a respectively which is soldered or otherwise suitably secured in position. Similar annular high energy permanent magnets 51 and 51a extend radially between the rings 17 and 19 at their opposite extremities and are each connected to both the latter, and soldered or otherwise secured to the adjacent peripheral faces of the said rings immediately behind and in electrical contact with the magnets 51 and 51a are contact members 52 and 52a and 53 and 53a respectively.

Due to the polarity of the permanent magnets 50 and 50a the polarity of the two annular faces 39b and 40b, or 39c and 40c, are the same, and similarly due to the polarity of the permanent magnets 51 and 51a the polarity of the two annular faces at end each of the rings 17 and 19 is also the same when the coils 16 and 18 are not energized. Thus at that time, as will be seen from the diagram in Figure 7, all the opposed pairs of magnetic faces are of the same polarity, and consequently repulsion is exerted between them. Thus clear spaces are provided midway of the gaps 42 in which the discs 5 are free to rotate unhindered by frictional contact with the iron particles, since the latter collect on opposite sides of the gaps immediately adjacent the poles. The magnetic flux then follows the paths B and C indicated in Figure 7. The purpose of the contact members 52, 52a, 53, and 53a is to provide better circuits for the flux.

However when the coils 16 and 18 are energized the magnetic faces are immediately of opposed polarity as indicated in Figure 8, so that a flux path D, substantially similar to the flux path A in Figure 6, is established. The reversal of polarity of the magnetic faces 39b and 40c is caused by the intensity of the flux set up by the coils 16 and 18, however, due to the fact that high energy permanent magnets 50, 50a, 51 and 51a are employed no permanent reduction in their output results after the current flow through the said coils has ceased.

It will thus be seen that in both embodiments herein described when the flux flow is parallel with the axes of the discs that the iron particles from chains drawn into close physical contact across the gaps parallel with the flux lines, and the discs are firmly held relative to the housing; and that when the flux flow is at right angles to the axes of the discs the iron particles collect immediately adjacent the pole faces and remain spaced from both sides of the discs, thereby leaving the latter free to rotate unhindered by the iron particles.

While in the foregoing the preferred embodiments of the invention have been described and shown, it is understood that they are susceptible to such further changes and alterations as fall within the scope of the appended claims.

What we claim is:

1. A fluid magnetic clutch including a housing, a shaft rotatably mounted thereby, discs fixed around the shaft and spaced from one another, two spaced annular electro magnets fixed in the housing between the discs and spaced from the latter, two annular permanent magnets fixed in each side of the housing in axial alignment with the electro magnets and spaced from the outer sides of the discs, annular pole pieces connecting the extremities of the permanent magnets remote from the discs, magnetic particles in the gaps on both sides of the discs, and means for energizing the electro magnets.

2. A fluid magnetic clutch including a housing having a shaft rotatably supported thereby, axially spaced discs fixed around the shaft, annular electro magnets arranged one within the other concentric with the shaft and fixed in the housing between and spaced from the inner faces of the discs, each electro magnet including a ring having a coil wound around it, said coils being electrically connected to one another and wound in opposite directions, means for energizing the coils, two spaced annular permanent magnets mounted in each side of the housing and outwardly spaced from the discs, said permanent magnets each being in axial alignment with one of the rings, an annular pole piece connecting the outer extremities of the permanent magnets on each side of the housing, and magnetic particles between the magnets and the discs.

3. A fluid magnetic clutch comprising a fluid-tight housing containing a suspension of magnetizable particles in a carrier fluid, a shaft projecting through said housing in fluid-tight relationship therewith, said shaft and said housing being susceptible to free relative rotation, a pair of annular discs fixedly secured to the shaft and surrounded by the carrier fluid, a pair of concentric annular rings secured to the housing and positioned between said discs, a magnetizing coil winding carried on each of said rings, and magnetic means carried by the housing to direct magnetic flux through the carrier fluid, the discs and the rings to affect the position of the magnetizible particles in the carrier fluid and the coercive force exerted thereby on the discs, the effect of such flux being reversible under the selective energization of the magnetic coil windings.

4. A fluid magnetic clutch comprising a fluid-tight housing containing a suspension of magnetizable particles in a carrier fluid, a shaft projecting through said housing in fluid-tight relationship therewith, said shaft and said housing being susceptible to free relative rotation, an annular disc fixedly secured to the shaft and surrounded by the carrier fluid, a pair of annular permanent magnets secured to the housing adjacent to the disc and magnetically connected together by a pole piece remote from the disc, and an electromagnet secured to the housing and having pole pieces adjacent the disc on the opposite side from the permanent magnets, the pole pieces of the electromagnet being of opposite polarity relative to the polarity of the permanent magnets when the electromagnet is deenergized and of like polarity when the electromagnet is energized.

5. A fluid magnetic clutch comprising a fluid-tight housing containing a suspension of magnetizable particles in a carrier fluid, a shaft projecting through said housing in fluid-tight relationship therewith, said shaft and said housing being susceptible to free relative rotation, a pair of annular discs fixedly secured to the shaft and surrounded by the carrier fluid, a pair of concentric annular rings secured to the housing and positioned between the discs, a magnetizing coil winding carried on each ring rendering each ring a pole piece for said winding, said windings being connected in series opposing relationship, two pairs of annular permanent magnets secured to the housing, each pair being positioned adjacent to a disc on the opposite side of the discs from the rings, one magnet of each pair being in radial alignment with one ring, and annular pole pieces secured in the housing to magnetically connect each pair of permanent magnets, the pole pieces of the coil windings being of opposite polarity relative to the polarity of the permanent magnets when the coil windings are deenergized and of like polarity when the coil windings are energized.

6. A fluid magnetic clutch comprising a liquid-tight housing containing a suspension of magnetizable particles in a carrier fluid, a shaft projecting through said housing in fluid-tight relationship therewith, said shaft and said housing being susceptible to free relative rotation, a disc fixed on the shaft and surrounded by the carrier fluid, a pole piece secured to the housing having poles opposite and spaced from one side of the disc, a permanent magnet connected to the pole piece in such a manner as to make the poles thereof of the same polarity, an electromagnet having poles opposite to the aforesaid poles and spaced from the other side of the disc, a permanent magnet connecting the poles of the electromagnet whereby both poles of the latter are of the same polarity when said electromagnet is not energized, and means for energizing the electromagnet to make its poles of opposite polarity.

7. A fluid magnetic clutch comprising a fluid-tight housing containing a suspension of magnetizable particles in a carrier fluid, a shaft projecting through said housing in a fluid-tight relationship therewith, said shaft and said housing being susceptible to free relative rotation, a pair of annular discs fixedly secured to the shaft and surrounded by the carrier fluid, a pair of concentric annular rings secured to the housing and positioned between said discs, a magnetizing coil winding carried on each of the rings, said windings being connected in series opposing relationship, a pole piece secured to the housing having poles opposite and spaced from one side of each disc, a permanent magnet connected with each pole piece in such a manner as to make the poles thereof of the same polarity, and permanent magnets magnetically connecting the inner surface of the outer ring to the outer surface of the inner ring at the extremities thereof adjacent to each disc, whereby the extremities of the rings are made pole pieces of like polarity when the electromagnet is deenergized and of unlike polarity when the electromagnet is energized.

BENERSON A. WADERLOW.
WINTHROP S. HORTON.

REFERENCES CITED

The following references are of record in the file of this patent:

UNITED STATES PATENTS

| Number | Name | Date |
|---|---|---|
| 1,303,484 | Langdon-Davies | May 13, 1919 |
| 2,130,870 | Boehne | Sept. 20, 1938 |
| 2,275,839 | Boehne | Mar. 10, 1942 |
| 2,348,967 | Duby | May 16, 1944 |

FOREIGN PATENTS

| Number | Country | Date |
|---|---|---|
| 485,591 | Belgium | Nov. 13, 1948 |

OTHER REFERENCES

Technical Report 1213, National Bureau of Standards, Washington, D. C. Received March 30, 1948.